Feb. 17, 1970  G. HACHTEL  3,495,773
TAMPER-PROOF ODOMETER
Filed Oct. 7, 1968
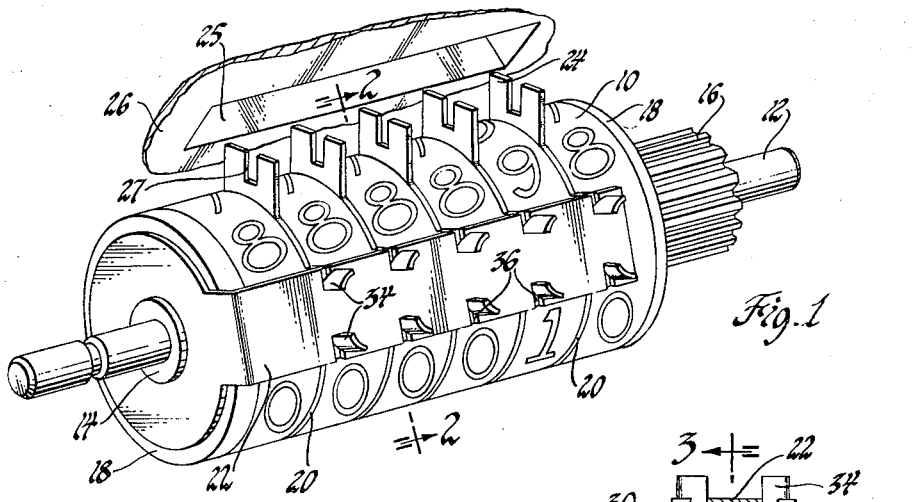
Fig.1
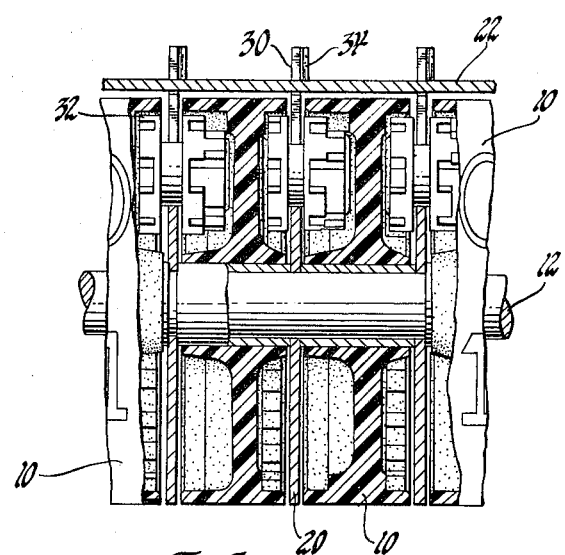
Fig.3
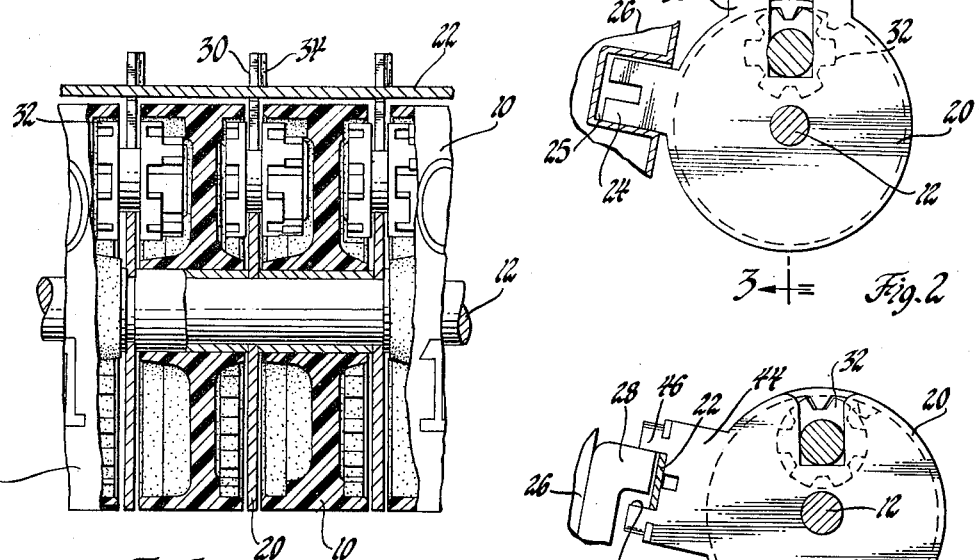
Fig.2
Fig.5
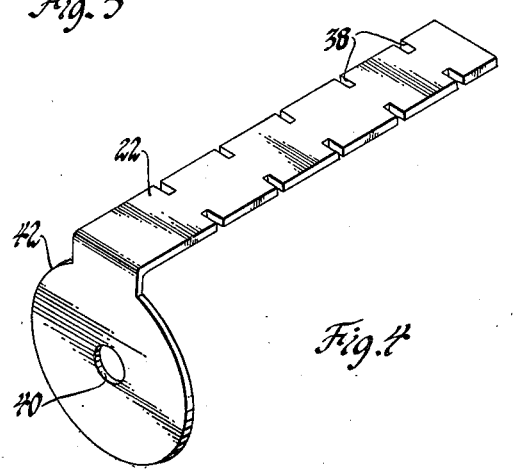
Fig.4
INVENTOR.
Guenter Hachtel
BY
P. A. Taucher
ATTORNEY

United States Patent Office 3,495,773
Patented Feb. 17, 1970

3,495,773
TAMPER-PROOF ODOMETER
Guenter Hachtel, Swartz Creek, Mich., assignor to General Motors Corporation, Detroit, Mich., a corporation of Delaware
Filed Oct. 7, 1968, Ser. No. 765,277
Int. Cl. G01c 22/00
U.S. Cl. 235—96
8 Claims

ABSTRACT OF THE DISCLOSURE

The invention relates to a numbered wheel type of odometer and, more particularly, to such an odometer having an L-shaped strap mounted on the odometer and across the numbered wheels and the pinion carrier plates to preclude rotation of the numbered wheels by means other than that provided to rotate the odometer during normal driving operations.

---

This invention relates to odometers of the numbered wheel type, generally used on automobiles to record the mileage of the automobile.

The odometer as used in this invention is similar to that shown in U.S. Patent No. 3,137,444. However, such an odometer can be tampered with and the reading changed very easily. This is done, for example, by using a sharp tool or pick to separate the numbered wheels from the pinion carrier plates to reach the pinion gears. The pinion gears are rotated and in turn rotate the numbered wheels, generally to a lower number, thereby indicating a lower mileage on the automobile than actually driven.

It is therefore an object of this invention to preclude tampering with an automobile odometer.

It is another object to provide a simple structure to maintain the odometer components in alignment and to preclude longitudinal movement.

It is a further object to provide a plate or strap member over the pinion gears of an odometer to preclude longitudinal movement of the components and, therefore, access to the pinion gears.

These and other important features of the invention will be shown and described in detail in the specification and drawings and claimed more particularly in the appended claims wherein:

FIGURE 1 is a perspective view of the preferred embodiment of the invention showing an assembled odometer having the restrictive strap member in place;

FIGURE 2 is a sectional view looking in the direction of arrows 2—2 in FIGURE 1;

FIGURE 3 is an enlarged sectional view looking in the direction of arrows 3—3 in FIGURE 2;

FIGURE 4 is a perspective view of a retaining strap member shown in place in FIGURE 1; and FIGURE 5 is an end view of a second embodiment showing the retaining strap member in a different location from that of FIGURE 1.

There is shown in FIGURE 1 an odometer assembly having number wheels 10 mounted for rotation on shaft 12. Two friction washers 14, made of brass or the like, fixed to remote portions of the shaft 12 maintain the numbered wheels 10, drive gear 16, end plates 18, and pinion carrier plates 20 in an assembled operating relationship during normal operation. Retaining or confining strap 22, also held in place by washers 14, serves to prevent longitudinal separation of the assembly to preclude tampering.

As shown in FIGURES 1 and 2, the preferred embodiment of the invention, each pinion carrier plate 20 has two integrally formed notched tongues 24 and 30. The primary purpose or use of tongue 24 is in retaining the pinion carrier plates in a slot or channel 25 in the speedometer casing or housing 26, preventing rotation of the carrier plates during operation of the odometer. It is understood that a bar or similar means, as shown at 28 in FIGURE 5, could be used on the housing 26 in place of channel 25. Such a bar would fit into the notches 27 to prevent rotation. Also, as shown in the prior art, a pin could be used.

Strap 22 assembled over the pinion gears is held in place by bent tabs or ears 34 formed on tongue 30. Tongue 30 as well as the strap 22 are formed or located over the pinion gears 32. The primary purpose of tongue 30 and strap 22 is to preclude the components of the assembly from being longitudinally separated from each other. More particularly, the strap is secured to the assembly in the manner shown to preclude direct tampering with the pinion gears. However, tongue 30 may be located on any portion of the pinion carrier plate. The tabs, prior to assembly of the strap thereto, are aligned with the edges of tongue 30 and are slit at 36 to permit easy bending during assembly. The tabs need not be slit, but can be made in such a manner to allow bending merely by twisting. Strap 22 has cutouts 38 matching tabs 34, which tabs are bent in the manner shown in FIGURE 1 to hold the strap 22 in place after assembly thereto. It is understood that other convenient holding members other than the tabs, such as welding, etc., may be used. The strap 22 has a hole 40 at one end in a depending member 42 as shown in FIGURE 4 for mounting on the shaft 12. The strap is therefore held in place over the assembled odometer components by washer 14, as well as tabs 34. Likewise, depending member 42 may have a slot or some other convenient means of retaining the strap on the shaft. The strap, however, need not be assembled on shaft 12 as shown, but may be a straight strap without the depending member. In eliminating depending member 42, the strap would be held in place by tabs 38 formed on each of the pinion carrier plates, as well as the end plates 18.

As shown in FIGURE 5, the second embodiment of the invention, there is a single tongue 44 having tabs 46 thereon, which tongue 44 not only serves as a means of retaining strap 22, but also prevents rotation of the pinion carrier plates during normal operation. As shown, bar 28 is formed or secured on housing 26 and is located between the tabs 46 to prevent rotation of the pinion carrier plates. A similar arrangement could be used between the tabs 34 of FIGURE 1, thereby eliminating the need for the tongue 24.

Operation of the odometer is similar to that of the prior art patent set forth above, which operation need not further be described.

Strap 22 is secured over the pinion carrier plates and the number wheels to prevent longitudinal movement of these elements. The strap will preclude the use of a tool or some other means to separate the pinion carrier plates and wheels in order for an individual to move the pinion gears after he has separated the number wheels and pinion carriers and thereby rotate the numbered wheels to indicate a different mileage reading, generally less than that actually driven.

Having thus fully and completely described my invention, I claim:

1. In a tamper-proof odometer, the combination comprising a plurality of numbered wheels and pinion carrier plates with said pinion carrier plates between said numbered wheels, pinion gears on said pinion carrier plates, first means on said pinion carrier plates to prevent rotation of said pinion carrier plates during operation, an L-shaped strap secured above said numbered wheels and said pinion carrier plates to preclude longitudinal movement of said numbered wheels and pinion carrier plates to thereby prevent access to said pinion gears and to prevent rotation of said pinion gears by means other than normal drive means, and drive means to sequentially turn said numbered wheels through said pinion gears to indicate a reading.

2. In a tamper-proof odometer as set forth in claim 1 wherein said strap is secured across said numbered wheels, pinion carrier plates, and under said first means by distorted tabs, with said tabs being integral with said first means.

3. In a tamper-proof odometer as set forth in claim 1 including a tongue on said pinion carrier plates spaced from said first means, wherein said L-shaped strap is secured across said tongue, said numbered wheels, and pinion carrier plates by distorted tabs, with said tabs being integral with said tongue.

4. In a tamper-proof odometer as set forth in claim 3 wherein said tongue and strap are located over said pinion gears.

5. A tamper-proof odometer as set forth in claim 1, wherein said pinion carrier plates include tabs, with said L-shaped strap having notches to fit over said tabs to hold the strap between the tabs and the pinion carrier plates, by distortion of said tabs above said strap, said strap thereby preventing access to and rotation of said pinion gears and therefore rotation of said numbered wheels, by other means than said normal drive means.

6. In a tamper-proof odometer as set forth in claim 3, wherein said first means also includes a tongue on each of said pinion carrier plates whereby the tongue is restrained to prevent rotation of said pinion carrier plates.

7. In a tamper-proof odometer as set forth in claim 2, wherein said first means includes said distorted tabs, and a bar in engagement with and across said distorted tabs to prevent rotation of said pinion carrier plates.

8. In a tamper-proof odometer as set forth in claim 5, wherein said first means is spaced from said L-shaped strap, and includes a tongue on each of said pinion carrier plates whereby said tongues are restrained to prevent rotation of said pinion carrier plates.

References Cited

UNITED STATES PATENTS

| | | | |
|---|---|---|---|
| 1,950,617 | 3/1934 | Lee | 235—96 |
| 2,004,881 | 6/1935 | Slye | 235—96 X |
| 2,304,516 | 12/1942 | White | 235—117 |
| 3,097,792 | 7/1963 | Harada | 235—95 X |
| 3,137,444 | 6/1964 | Harada | 235—95 X |

RICHARD B. WILKINSON, Primary Examiner

STANLEY A. WAL, Assistant Examiner